US006821008B2

(12) United States Patent
Tokoro et al.

(10) Patent No.: US 6,821,008 B2
(45) Date of Patent: Nov. 23, 2004

(54) PROJECTOR HEADLAMP

(75) Inventors: Yosuke Tokoro, Saitama-ken (JP); Hitoshi Taniuchi, Tokyo (JP); Takashi Akutagawa, Tokyo (JP)

(73) Assignees: Honda Giken Kogyo Kabushiki Kaisha, Tokyo (JP); Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 10/267,901

(22) Filed: Oct. 9, 2002

(65) Prior Publication Data

US 2003/0107901 A1 Jun. 12, 2003

(30) Foreign Application Priority Data

Oct. 15, 2001 (JP) ....................................... 2001-316880

(51) Int. Cl.[7] ............................ B60Q 1/04; F21V 13/12

(52) U.S. Cl. ....................... 362/539; 362/308; 362/328; 362/520

(58) Field of Search ................................ 362/308, 328, 362/516, 520, 521, 538, 539

(56) References Cited

U.S. PATENT DOCUMENTS 4,577,260 A * 3/1986 Tysoe ......................... 362/521
4,857,794 A 8/1989 Watanabe .................... 313/113
5,422,793 A 6/1995 Kobayashi .................. 362/538
5,674,001 A * 10/1997 Weigert ....................... 362/308
6,186,651 B1 * 2/2001 Sayers et al. ............... 362/539

FOREIGN PATENT DOCUMENTS

| | | |
|---|---|---|
| DE | 33 11 762 A1 | 10/1984 |
| EP | 0 325 254 A2 | 7/1989 |
| EP | 1 225 386 A2 | 7/2002 |
| JP | 2001-191365 | 7/2001 |

* cited by examiner

*Primary Examiner*—Alan Cariaso
(74) *Attorney, Agent, or Firm*—Weingarten, Schrugin, Gagnebin & Lebovici LLP

(57) ABSTRACT

A conventional projector headlamp has low efficiency because an amount of light is shaded almost half by a shutter for a low-beam light distribution. In addition, only a projection lens is seen in the installed condition, inviting old-fashioned designs disadvantageously. In a projector headlamp (1) of the invention, a vertical section passing through the center of a projection lens (5) includes a convex front surface and a flat rear surface (5*a*). A line connecting the upper end to the lower end on the rear surface (5*a*) is tilted to the vertical. Thus, the projection lens (5) has a prismatic action for directing the entire light downward. This is effective to reduce an amount of light to be shaded by a shutter (4) and provide improved brightness and novel designed appearances.

15 Claims, 3 Drawing Sheets

— PRIOR ART —

PROJECTOR HEADLAMP

FIELD OF THE INVENTION

The present invention relates to a vehicular lamp and, more particularly, to a vehicular lamp for lighting such as a headlamp and a fog lamp. Specifically, it relates to a headlamp named a projector type, which comprises a spheroidal reflector having a first focus and a second focus, a projection lens, and a shutter optionally employed to configure a light distribution property by shading part of light unnecessary for the light distribution property.

BACKGROUND ART

An arrangement of such the projector headlamp 90 in the art is exemplified in FIG. 7. It comprises an elliptical (e.g. spheroidal or composite ellipsoidal) reflector 91 having a first focus and a second focus. A light source 92 such as a filament in a halogen lamp and an arc in a metal-halide discharge tube is located at the first focus for converging it on the second focus f2.

If the projector headlamp 90 is employed to form a low-beam light distribution, a shutter 93 is arranged in the vicinity of the second focus f2 to shade part of upward light unnecessary for the low-beam light distribution. A projection lens 94 having a focus in the vicinity of the shutter 93 is employed to project light forward to obtain a desired light distribution property.

In the above conventional projector headlamp 90, the however, the projection lens 94 or the only part seen from outside is made inevitably in the form of a convex lens having a convex front surface and a flat rear surface, resulting in a uniform shape and old-fashioned design disadvantageously.

SUMMARY OF THE INVENTION

The present invention provides a projector headlamp as specific means for solving the above conventional subjects. The projector headlamp comprises a reflector having a first focus and a second focus; and a projection lens having a focus in the vicinity of the second focus for projecting a light image substantially located at the first focus. A vertical section passing through the center of the projection lens includes a convex front surface at the projection side of light to external and a flat rear surface opposing to the reflector. A line connecting the upper end to the lower end on the rear surface is tilted to the vertical. Alternatively, the projector headlamp comprises a reflector having a first focus and a second focus; and a projection lens having a focus in the vicinity of the second focus for projecting a light image substantially located at the first focus. A vertical section passing through the center of the projection lens includes a convex front surface at the projection side of light to external and a convex or concave rear surface opposing to the reflector.

Other features and advantages of the invention will be apparent from the following description of the preferred embodiments thereof.

BRIEF DESCRIPTION OF THE DRAWINGS

The present invention will be more fully understood from the following detailed description with reference to the accompanying drawings, in which.

DETAILED DESCRIPTION OF THE PREFERRED EMBODIMENTS

Figure 1:
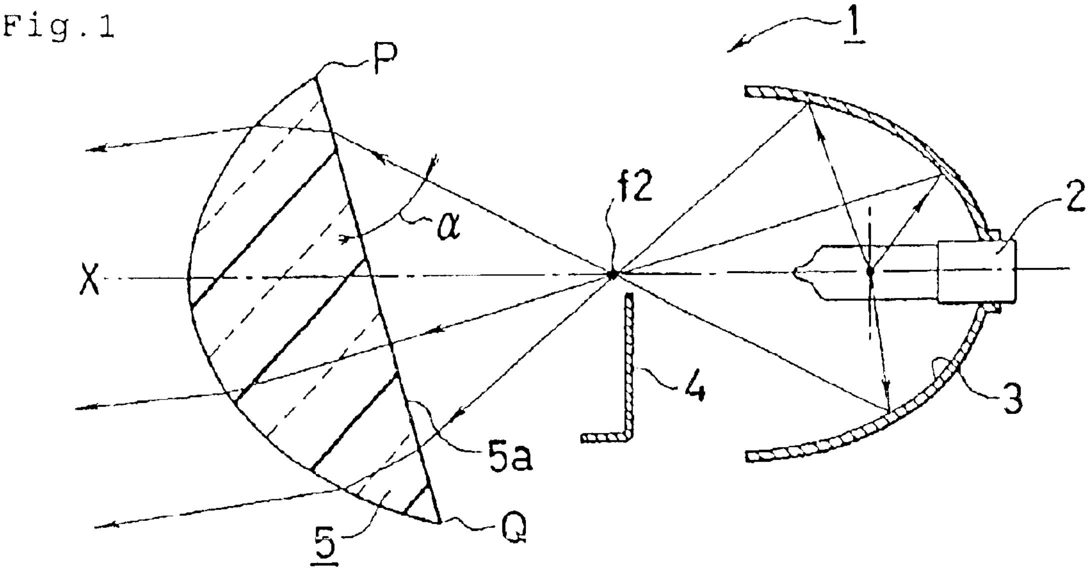
FIG. 1 is a cross-sectional view showing a first embodiment of the projector headlamp according to the present invention.

The present invention will now be described in detail based on the drawings. FIG. 1 shows a first embodiment of the projector headlamp 1 according to the invention. Also in the present invention, like the prior art, the projector headlamp 1 comprises a light source 2, an elliptical or spheroidal reflector 3 for positioning the light source 2 at the location of the first focus, a shutter 4 optionally arranged in the vicinity of the second focus f2 to form a low-beam light distribution, if required, and a projection lens 5 for projecting a light beam shaped through the reflector 3 and shutter 4 in the lighting direction.

In the invention, the projection lens 5 may be formed by injection molding of a glass material or a resinous material similar to the prior art. In recent years, thanks to improved heat-resisting property and molding technology, it is possible to mold such a thick shape with non-uniform thickness as the projection lens 5 without forming any depression. In the first embodiment of the invention, a flat rear surface 5*a* is tilted. In a vertical section passing through the centerline X of the projection lens 5, the upper end P is located forward relative to the lower end Q in the lighting direction of the projector headlamp 1.

Thus, the projection lens 5 acts as an equivalent that combines a prism for refracting light downward therewith. Accordingly, the entire light from the reflector 3 can be refracted downward at a certain angle. In consideration of the above action on the projector headlamp 1 for forming a low-beam light distribution by way of example, the low-beam light distribution is basically adjusted by the shutter 4 for shading part of light unnecessary for the low-beam light distribution so as not to contain upward light.

In the present invention, the projection lens 5 is provided with the prismatic action for refracting the entire light from the reflector 3 downward as described above, part of the light reflected from the reflector 3 or the upward light in the art can be converted into downward light or horizontal light. Accordingly, the amount of light shaded at the shutter 4 can be decreased compared to the prior art, resulting in an increase in the amount of light projected from the projector headlamp 1.

Figure 2:
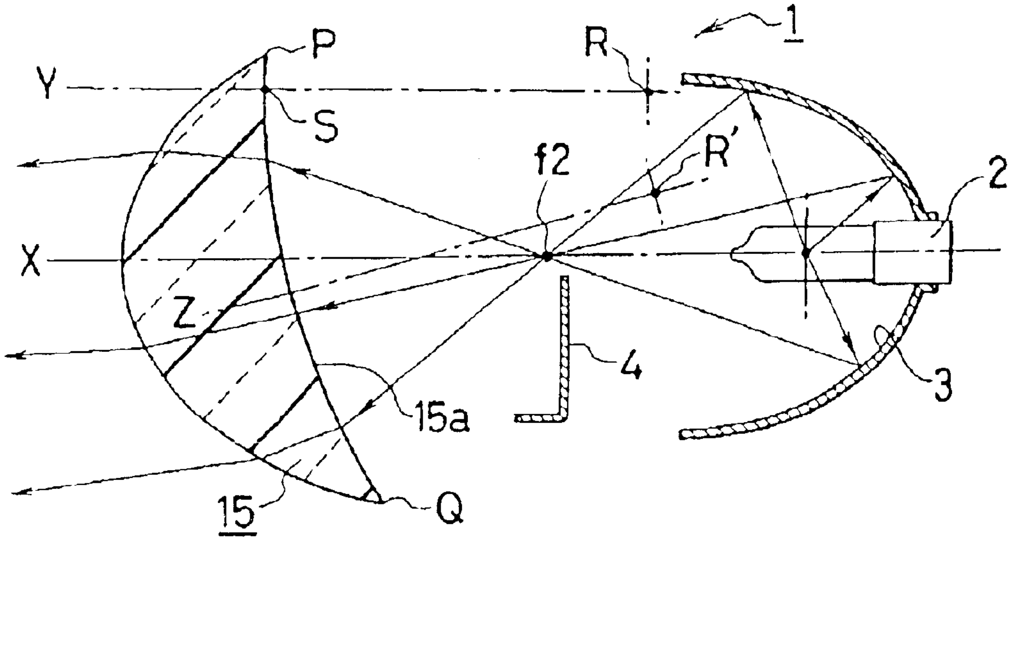
FIG. 2 is a cross-sectional view showing a second embodiment of the projector headlamp according to the present invention.

FIG. 2 shows a second embodiment of the projector headlamp 1 according to the present invention. In the first embodiment, the projection lens 5 is described as to have the rear surface formed flat. To the contrary, in the second embodiment, a projection lens 15 is formed to have such a rear surface 15*a* that exhibits a circular arc in a vertical section passing through the centerline X. In the preceding first embodiment, as described above, the amount of light from the projector headlamp 1 can be increased exactly. On the other hand, at the upper end P of the projection lens 5, the light reflected from the reflector 3 enters the rear surface of the projection lens 5 at a gentle angle α (see FIG. 1), which easily causes surface reflections.

Taking the above situation into consideration, in the second embodiment, the rear surface 15*a* of the projection lens 15 is shaped to have the prismatic action as described in the first embodiment. In addition, the light reflected from the reflector 3 is allowed to enter the rear surface at an angle as close to right angle as possible. This is effective to prevent the loss due to the surface reflection from occurring. Specifically, the rear surface is formed as a circular arc that has its center R at the second focus f2.

If the center R is determined at the location of the second focus f2, the light to be radiated virtually from the second focus f2 enters the projection lens 15 at almost right angle with no substantial surface reflection. In this case, however, the upper and lower parts of the shape (circular arc) of the rear surface 15*a* are symmetrical with respect to the centerline X, which loses the expected prismatic action (see FIG. 3). Thus, the center of the circular arc is determined at an appropriately elevated location. Therefore, a concave vertex S set in the rear surface 15*a* of the projection lens 15 is present in the proximity of the upper end P of the projection lens 15.

On formation of the rear surface 15*a*, the circular arc is rotated about an axis Y that connects the center R with the vertex S, or an axis almost parallel to the centerline X, to obtain the rear surface 15*a* that is a curved surface in the form of an approximately recessed sphere. As for the rear surface 15*a*, the circular arc having the center R' on a line tilted to the centerline X and shown as an axis Z in the figure may be replaced with the approximately recessed sphere obtained by rotating about the axis Z.

The formation of the circular arc may cause upward and downward diffusions that are not much needed for the vehicular headlamp. Therefore, it is required to determine an appropriate diameter to keep the diffusions within a necessary range. Alternatively, the projection lens 15 may be appropriately designed to alter the curvature at the front surface to determine a desired diffusion angle.

Thus, in the projector headlamp 1 of the second embodiment, thanks to the prismatic action in the first embodiment, it is possible to reduce the amount of light to be shaded at the shutter 4. In addition, it is also possible to reduce the surface reflection at the rear surface 15*a* of the projection lamp 15. The synergy of both actions can impart a further brightness to the projector headlamp 1.

Figure 3:
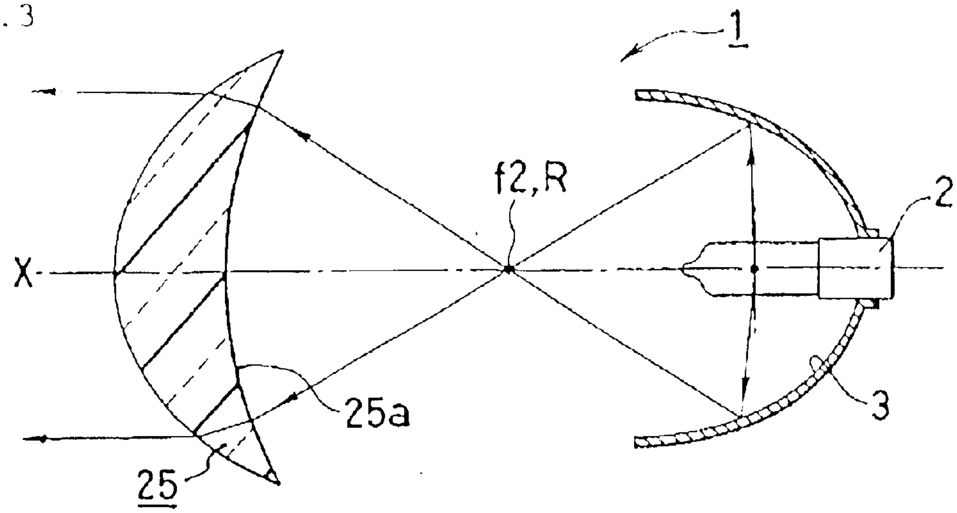
FIG. 3 is a cross-sectional view showing a third embodiment of the projector headlamp according to the present invention.

FIG. 3 shows a third embodiment of the projector headlamp 1 according to the present invention. The third embodiment exemplifies the projector headlamp 1 for a high-beam light distribution. In this case, the shutter 4 is not provided. Therefore, even though the prismatic action described in the first and second embodiments is provided, a particular effect is not found in the action for increasing the amount of light.

For the purpose of reducing the surface reflection at a rear surface 25*a* of a projector lens 25, the rear surface 25*a* is shaped in the form of a circular arc that has the center R almost located at the second focus f2. Therefore, the light from the reflector 3 can enter the projector lens 25 at right angle. This is effective to reduce the surface reflection at the rear surface 25*a*. As a result, an increase is expectable in the amount of light from the projector headlamp 1, together with less stray light caused from surface reflection and highly transparent lighting condition.

Figure 4:
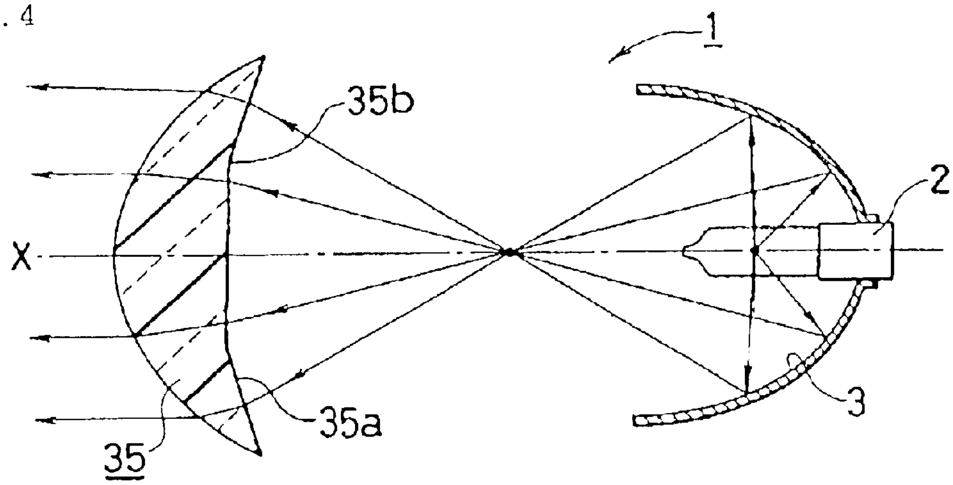
FIG. 4 is a cross-sectional view showing a fourth embodiment of the projector headlamp according to the present invention.
Figure 5:
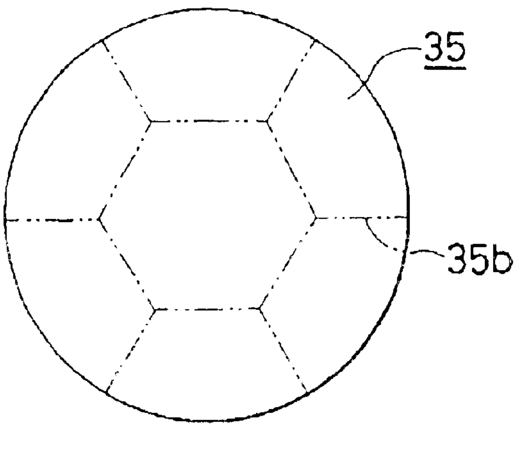
FIG. 5 illustrates a front view of the fourth embodiment.

FIGS. 4 and 5 show a fourth embodiment of the projector headlamp 1 according to the present invention. In the preceding second and third embodiments, the rear surfaces 15*a*, 25*a* of the projection lens 15, 25 are each configured in the form of the recessed sphere that is obtained by rotating a recessed circular arc about an appropriate axis. To the contrary, in the fourth embodiment, a rear surface 35*a* of a projection lens 35 is shaped in the form of a feature concave and ridged 35*b*, for example, a polygon inscribed the above circular arc. The depicted example is an application to the third embodiment shown in FIG. 3 and is practically produced using a mold for injection molding a resinous material.

Thus, when the projection lens 35 is observed from outside the projector headlamp 1, the ridges 35*b* formed in the rear surface 35*a* can be seen during lighting as well as non-lighting. As a result, an unprecedented novel appearance can be obtained. At the same time, since the light from the reflector 3 enters the projection lens 35 at near right angle, the amount of light can be increased expectedly.

Figure 6:
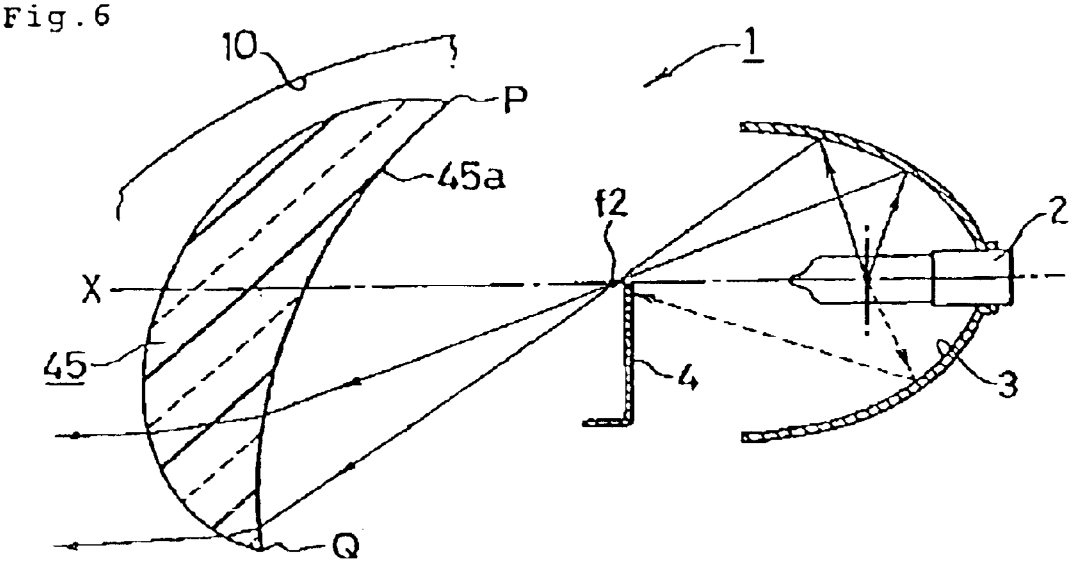
FIG. 6 is a cross-sectional view showing a fifth embodiment of the projector headlamp according to the present invention.

FIG. 6 shows a fifth embodiment of the present invention, which is obtained by essentially turning the second embodiment upside down for the purpose of matching the design with the shape of the vehicle body 10 of the type of front end down named slant nose. (Accordingly, it is also obtained by turning the first embodiment upside down.) In the fifth embodiment, a projection lens 45 has a front surface also tilted upward to further emphasize a designing effect.

In this example, on the projection lens 45, the lower end Q is located forward in the lighting direction relative to the upper end P. Therefore, it is difficult to capture the light reflected at the upper half of the reflector 3, which serves as the major part for formation of the light distribution in the projector headlamp 1 of this type, resulting in a dark headlamp possibly. Accordingly, it is preferable to ensure the amount of light by altering the curvature of the upper half different from that of the lower half to displace either or both of the front and rear surfaces of the projection lens 45 closer to the reflector.

As obvious from the forgoing description, the projector headlamp according to the present invention comprises a reflector having a first focus and a second focus; and a projection lens having a focus in the vicinity of the second focus for projecting a light image substantially located at the first focus. A vertical section passing through the center of the projection lens includes a convex front surface at the projection side of light to external and a rear surface opposing to the reflector. A line connecting the upper end to the lower end on the rear surface is tilted to the vertical. Therefore, first, the light reflected from the reflector is refracted downward through the tilted rear surface. This is effective to reduce the amount of light to be shaded at the shutter and, in particular, to reinforce the amount of light in the low-beam light distribution that has been pointed out to have lack of the amount of light. Accordingly, the present invention is excellently effective to improve the performance of the projector headlamp of this type.

Second, the polygonal concave rear surface of the projection lens is possible to impart novel appearances through a variety of designs to the projector headlamp even though only the projection lens is observed when the projector headlamp is mounted on the vehicle body. Accordingly, the present invention is also excellently effective to improve the fine view of the projector headlamp of this type.

Having described the embodiments consistent with the invention, other embodiments and variations consistent with the invention will be apparent to those skilled in the art. Therefore, the invention should not be viewed as limited to the disclosed embodiments but rather should be viewed as limited only by the spirit and scope of the appended claims.

What is claimed is:

1. A projector headlamp, comprising:

a reflector having an optical axis, a first focus, and a second focus; and a projection lens having a focus at or near the second focus of the reflector for projecting a light image substantially located at the first focus of the reflector, the projection lens comprising a vertical portion traversing the optical axis of the reflector, the vertical portion comprising an upper end, a lower end, a convex front surface at a side of the projector from which light is projected and a concave rear surface opposing the reflector, the vertical portion being tilted in relation to the optical axis, so that a line connecting the upper end to the lower end is not orthogonal to the optical axis of the reflector.

2. The projector headlamp according to claim 1, wherein the projector is tilted forward so that a distance between the upper end and the second focus of the reflector is further than the distance between the lower end and the second focus of the reflector.

3. The projector headlamp according to claim 1, wherein the projector is tilted rearward so that a distance between the upper end and the second focus of the reflector is less than a distance between the lower end and the second focus of the reflector.

4. The projector headlamp according to claim 1, wherein the projection lens is composed of a resinous material.

5. The projector headlamp according to claim 4, wherein the projection lens is formed using injection molding.

6. The projector headlamp according to claim 2, wherein the projection lens is composed of a resinous material.

7. The projector headlamp according to claim 6, wherein the projection lens is formed with injection molding.

8. The projector headlamp according to claim 3, wherein the projection lens is composed of a resinous material.

9. The projector headlamp according to claim 8, wherein the projection lens is formed using injection molding.

10. The projector headlamp according to claim 1, wherein the rear surface of the projection lens comprises an upper portion and a center portion, the upper portion comprising an upper concave shape having an upper vertex and the center portion comprising a center concave shape having a center vertex, the upper vertex having a radius centered at a center elevated with respect to a center of the radius for the center vertex.

11. The projector headlamp according to claim 1, wherein the rear surface comprises a ridge portion and a center portion, the center portion comprising a concave surface having a center vertex having a radius centered at the second focus of the reflector, the ridge portion comprising a flat surface ridge portion.

12. The projector headlamp according to claim 11, wherein the ridge portion comprises six flat surfaces distributed evenly around the periphery of the rear surface of the projection lens, to form a hexagon.

13. The projector headlamp according to claim 2, further comprising a shade to block high beam light from entering the projector lens.

14. The projector headlamp according to claim 3, wherein the projector headlamp does not comprise a shade positioned in the path of light from the reflector to the second focus.

15. The projector headlamp according to claim 3, wherein the rear surface of the projection lens comprises a lower portion and a center portion, the lower, portion comprising a lower vertex and the center portion comprising a center vertex, the lower vertex having a radius centered at a center lower than a center of the radius for the center vertex, the projection lens being titlted rearward so that a distance between an upper end of the projection lens and the second focus is less than a distance between a lower end of the projection lens and the second focus.

* * * * *

UNITED STATES PATENT AND TRADEMARK OFFICE

CERTIFICATE OF CORRECTION

PATENT NO. : 6,821,008 B2
APPLICATION NO. : 10/267901
DATED : November 23, 2004
INVENTOR(S) : Yosuke Tokoro et al.

It is certified that error appears in the above-identified patent and that said Letters Patent is hereby corrected as shown below:

Please delete Column 1, line 1 through Column 5, line 4 and substitute with the new specification as follows:

-- PROJECTOR HEADLAMP

Field of the Invention

The present invention relates to a vehicular lamp and, more particularly, to a vehicular lamp for lighting such as a headlamp and a fog lamp. Specifically, it relates to a projector type headlamp, which comprises a spheroidal reflector having a first focus and a second focus, a projection lens, and a shutter optionally employed to configure a light distribution property by shading part of light unnecessary for the light distribution property.

Background Art

Figure 7:
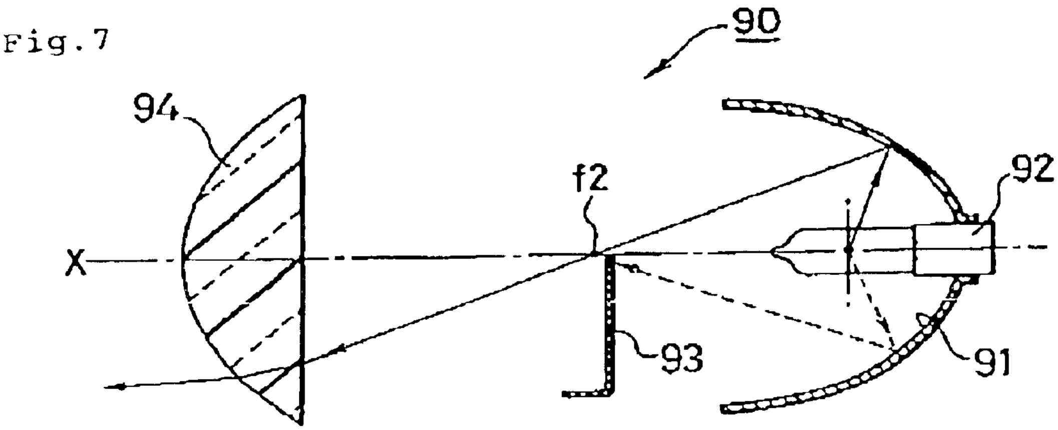
FIG. 7 is a cross-sectional view showing the prior art.

An arrangement of a conventional projector headlamp 90 is exemplified in Fig. 7. It comprises an elliptical (e.g., spheroidal or composite ellipsoidal) reflector 91 having a first focus and a second focus. A light source 92 (such as a filament in a halogen lamp and an arc in a metal-halide discharge tube) is located at the first focus f1 for convergence on the second focus f2.

UNITED STATES PATENT AND TRADEMARK OFFICE

CERTIFICATE OF CORRECTION

PATENT NO. : 6,821,008 B2
APPLICATION NO. : 10/267901
DATED : November 23, 2004
INVENTOR(S) : Yosuke Tokoro et al.

It is certified that error appears in the above-identified patent and that said Letters Patent is hereby corrected as shown below:

Please delete Column 1, line 1 through Column 5, line 4 and substitute with the new specification as follows: (cont'd)

If the projector headlamp 90 is employed to form a low-beam light distribution, a shutter 93 is arranged in the vicinity of the second focus f2 to shade part of upward light unnecessary for the low-beam light distribution. A projection lens 94 having a focus in the vicinity of the shutter 93 is employed to project light forward to obtain a desired light distribution property. --

Signed and Sealed this

Twentieth Day of March, 2007

JON W. DUDAS

*Director of the United States Patent and Trademark Office*

UNITED STATES PATENT AND TRADEMARK OFFICE

CERTIFICATE OF CORRECTION

PATENT NO. : 6,821,008 B2
APPLICATION NO. : 10/267901
DATED : November 23, 2004
INVENTOR(S) : Yosuke Tokoro et al.

It is certified that error appears in the above-identified patent and that said Letters Patent is hereby corrected as shown below:

Please delete Column 1, line 1 through Column 5, line 4 and substitute with the new specification as follows:

-- PROJECTOR HEADLAMP

Field of the Invention

The present invention relates to a vehicular lamp and, more particularly, to a vehicular lamp for lighting such as a headlamp and a fog lamp. Specifically, it relates to a projector type headlamp, which comprises a spheroidal reflector having a first focus and a second focus, a projection lens, and a shutter optionally employed to configure a light distribution property by shading part of light unnecessary for the light distribution property.

Background Art

An arrangement of a conventional projector headlamp 90 is exemplified in Fig. 7. It comprises an elliptical (e.g., spheroidal or composite ellipsoidal) reflector 91 having a first focus and a second focus. A light source 92 (such as a filament in a halogen lamp and an arc in a metal-halide discharge tube) is located at the first focus f1 for convergence on the second focus f2.

If the projector headlamp 90 is employed to form a low-beam light distribution, a shutter 93 is arranged in the vicinity of the second focus f2 to shade part of upward light unnecessary for the low-beam light distribution. A projection lens 94 having a focus in the vicinity of the shutter 93 is employed to project light forward to obtain a desired light distribution property.

In the above conventional projector headlamp 90, the projection lens 94 or the part seen from outside has a convex front surface and a flat rear surface, resulting in a uniform shape and old-fashioned design.

Summary of the Invention

The present invention provides a projector headlamp to solve the above issues. The projector headlamp comprises a reflector having a first focus and a second focus; and a projection lens having a focus in the vicinity of the second focus for projecting a light image substantially located at the first focus. The projector lens has a vertical portion traversing the center of the projection lens, which includes a convex front surface at a projection side and a flat rear surface opposing the reflector.

CERTIFICATE OF CORRECTION

PATENT NO. : 6,821,008 B2
APPLICATION NO. : 10/267901
DATED : November 23, 2004
INVENTOR(S) : Yosuke Tokoro et al.

It is certified that error appears in the above-identified patent and that said Letters Patent is hereby corrected as shown below:

Please delete Column 1, line 1 through Column 5, line 4 and substitute with the new specification as follows: (cont'd)

A line connecting the upper end to the lower end on the rear surface is tilted in relation to vertical. Alternatively, the projector headlamp comprises a reflector having a first focus and a second focus; and a projection lens having a focus in the vicinity of the second focus for projecting a light image substantially located at the first focus. A vertical portion passing through the center of the projection lens includes a convex front surface at the projection side and a convex or concave rear surface opposing the reflector.

Other features and advantages of the invention will be apparent from the following description of the preferred embodiments thereof.

Brief Description of the Drawings

The present invention will be more fully understood from the following detailed description with reference to the accompanying drawings, in which:

Fig. 1 is a cross-sectional view showing a first embodiment of the projector headlamp according to the present invention;

Fig. 2 is a cross-sectional view showing a second embodiment of the projector headlamp according to the present invention;

Fig. 3 is a cross-sectional view showing a third embodiment of the projector headlamp according to the present invention;

Fig. 4 is a cross-sectional view showing a fourth embodiment of the projector headlamp according to the present invention;

Fig. 5 illustrates a front view of the fourth embodiment;

Fig. 6 is a cross-sectional view showing a fifth embodiment of the projector headlamp according to the present invention; and Fig. 7 is a cross-sectional view showing the prior art.

Detailed Description of the Preferred Embodiments

The present invention will now be described in detail based on the drawings. Fig. 1 shows a first embodiment of the projector headlamp 1 according to the invention. In this embodiment, like the prior art, the projector headlamp 1 comprises a light source 2, an elliptical or spheroidal reflector 3 for positioning the light source 2 at the location of the first focus, a shutter 4 optionally arranged in the vicinity of the second focus f2 to form a low-beam light distribution, if required, and a projection lens 5 for projecting a light beam shaped through the reflector 3 and shutter 4 in the lighting direction.

UNITED STATES PATENT AND TRADEMARK OFFICE

CERTIFICATE OF CORRECTION

PATENT NO. : 6,821,008 B2
APPLICATION NO. : 10/267901
DATED : November 23, 2004
INVENTOR(S) : Yosuke Tokoro et al.

It is certified that error appears in the above-identified patent and that said Letters Patent is hereby corrected as shown below:

Please delete Column 1, line 1 through Column 5, line 4 and substitute with the new specification as follows: (cont'd)

The projection lens 5 may be formed by injection molding of a glass material or a resinous material similar to the prior art. In recent years, thanks to improved heat-resistance and molding technology, it is possible to mold such a thick shape with a non-uniform thickness as the projection lens 5 without forming any depression. In the first embodiment of the invention, a flat rear surface 5a is tilted. In a vertical section passing through the centerline X of the projection lens 5, the upper end P is located forward relative to the lower end Q in the lighting direction of the projector headlamp 1.

Thus, the projection lens 5 acts as an equivalent that combines a prism for refracting light downward therewith. Accordingly, the entire light from the reflector 3 can be refracted downward at a certain angle. In consideration of the above action on the projector headlamp 1 for forming a low-beam light distribution by way of example, the low-beam light distribution is basically adjusted by the shutter 4 for shading the part of light unnecessary for the low-beam light distribution so it does not contain upward light.

The projection lens 5 is provided with a prismatic action for refracting the entire light from the reflector 3 downward as described above, and part of the light reflected from the reflector 3 or the upward light in the art can be converted into downward light or horizontal light. Accordingly, the amount of light shaded at the shutter 4 can be decreased compared to the prior art, resulting in an increase in the amount of light projected from the projector headlamp 1.

Fig. 2 shows a second embodiment of the projector headlamp 1 according to the present invention. In the first embodiment, the projection lens 5 has a flat rear surface. In the second embodiment, projection lens 15 has a rear surface 15a that exhibits a circular arc in a vertical section passing through the centerline X. In the preceding first embodiment, as described above, the amount of light from the projector headlamp 1 can be increased exactly. On the other hand, at the upper end P of the projection lens 5, the light reflected from the reflector 3 enters the rear surface of the projection lens 5 at a gentle angle α (see Fig. 1), which easily causes surface reflections.

Taking the above situation into consideration, in the second embodiment, the rear surface 15a of the projection lens 15 is shaped to have the prismatic action as described in the first embodiment. In addition, the light reflected from the reflector 3 is allowed to enter the rear surface at an angle as close to right angle as possible. This is effective to prevent the loss due to the surface reflection from occurring.

UNITED STATES PATENT AND TRADEMARK OFFICE

CERTIFICATE OF CORRECTION

PATENT NO. : 6,821,008 B2
APPLICATION NO. : 10/267901
DATED : November 23, 2004
INVENTOR(S) : Yosuke Tokoro et al.

It is certified that error appears in the above-identified patent and that said Letters Patent is hereby corrected as shown below:

Please delete Column 1, line 1 through Column 5, line 4 and substitute with the new specification as follows: (cont'd)

The rear surface is formed as a circular arc that has its center R at the second focus f2. If the center R is determined at the location of the second focus f2, the light to be radiated virtually from the second focus f2 enters the projection lens 15 at an almost right angle with no substantial surface reflection. In this case, however, the upper and lower parts of the shape (circular arc) of the rear surface 15a are symmetrical with respect to the centerline X, which loses the expected prismatic action (see Fig. 3). Thus, for an upper part, the center of the circular arc is at an appropriately elevated location. Therefore, a concave vertex S is set in the rear surface 15a of the projection lens 15 in the proximity of the upper end P of the projection lens 15.

On formation of the rear surface 15a, the circular arc is rotated about an axis Y that connects the center R with the vertex S, or an axis almost parallel to the centerline X, to obtain the rear surface 15a that is a curved surface in the form of an approximately recessed sphere. As for the rear surface 15a, the circular arc having the center R′ on a line tilted to the centerline X and shown as an axis Z in the figure may be replaced with the approximately recessed sphere obtained by rotating about the axis Z.

The formation of the circular arc may cause upward and downward diffusions that are not much needed for the vehicular headlamp. Therefore, it is required to determine an appropriate diameter to keep the diffusions within a necessary range. Alternatively, the projection lens 15 may be appropriately designed to alter the curvature at the front surface to determine a desired diffusion angle.

Thus, in the projector headlamp 1 of the second embodiment, thanks to the prismatic action in the first embodiment, it is possible to reduce the amount of light to be shaded at the shutter 4. In addition, it is also possible to reduce the surface reflection at the rear surface 15a of the projection lamp 15. The synergy of both actions can impart a further brightness to the projector headlamp 1.

Fig. 3 shows a third embodiment of the projector headlamp 1 according to the present invention. The third embodiment exemplifies the projector headlamp 1 for a high-beam light distribution. In this case, the shutter 4 is not provided. Therefore, even though the prismatic action described in the first and second embodiments is provided, a particular effect is not found in the action for increasing the amount of light.

UNITED STATES PATENT AND TRADEMARK OFFICE
CERTIFICATE OF CORRECTION

PATENT NO. : 6,821,008 B2 
APPLICATION NO. : 10/267901
DATED : November 23, 2004
INVENTOR(S) : Yosuke Tokoro et al.

It is certified that error appears in the above-identified patent and that said Letters Patent is hereby corrected as shown below:

Please delete Column 1, line 1 through Column 5, line 4 and substitute with the new specification as follows: (cont'd)

For the purpose of reducing the surface reflection at a rear surface 25a of a projector lens 25, the rear surface 25a is shaped in the form of a circular arc that has the center R almost located at the second focus f2. Therefore, the light from the reflector 3 can enter the projector lens 25 at right angle. This is effective to reduce the surface reflection at the rear surface 25a. As a result, an increase is expectable in the amount of light from the projector headlamp 1, together with less stray light caused from surface reflection and highly transparent lighting condition.

Figs. 4 and 5 show a fourth embodiment of the projector headlamp 1 according to the present invention. In the preceding second and third embodiments, the rear surfaces 15a, 25a of the projection lens 15, 25 are each configured in the form of the recessed sphere that is obtained by rotating a recessed circular arc about an appropriate axis. To the contrary, in the fourth embodiment, a rear surface 35a of a projection lens 35 is shaped in the form of a feature concave and ridged 35b, for example, a polygon inscribed the above circular arc. The depicted example is an application to the third embodiment shown in Fig. 3 and is practically produced using a mold for injection molding a resinous material.

Thus, when the projection lens 35 is observed from outside the projector headlamp 1, the ridges 35b formed in the rear surface 35a can be seen during lighting as well as non-lighting. As a result, an unprecedented novel appearance can be obtained. At the same time, since the light from the reflector 3 enters the projection lens 35 at near right angle, the amount of light can be increased.

Fig. 6 shows a fifth embodiment of the present invention, which is obtained by essentially turning the second embodiment upside down for the purpose of matching the design with the shape of the vehicle body 10 of the type of front end down named slant nose. (Accordingly, it is also obtained by turning the first embodiment upside down.) In the fifth embodiment, a projection lens 45 has a front surface also tilted upward to further emphasize a designing effect.

UNITED STATES PATENT AND TRADEMARK OFFICE

CERTIFICATE OF CORRECTION

PATENT NO. : 6,821,008 B2
APPLICATION NO. : 10/267901
DATED : November 23, 2004
INVENTOR(S) : Yosuke Tokoro et al.

It is certified that error appears in the above-identified patent and that said Letters Patent is hereby corrected as shown below:

Please delete Column 1, line 1 through Column 5, line 4 and substitute with the new specification as follows: (cont'd)

In this example, on the projection lens 45, the lower end Q is located forward in the lighting direction relative to the upper end P. Therefore, it is difficult to capture the light reflected at the upper half of the reflector 3, which serves as the major part for formation of the light distribution in the projector headlamp 1 of this type, possibly resulting in a dark headlamp. Accordingly, it is preferable to ensure the amount of light by altering the curvature of the upper half of reflector 3 different from that of the lower half to displace either or both of the front and rear surfaces of the projection lens 45 closer to the reflector.

As apparent from the forgoing description, the projector headlamp according to the present invention comprises a reflector having a first focus and a second focus; and a projection lens having a focus in the vicinity of the second focus for projecting a light image substantially located at the first focus. A vertical section passing through the center of the projection lens includes a convex front surface at the projection side of light to external and a rear surface opposing to the reflector. A line connecting the upper end to the lower end on the rear surface is tilted to the vertical. Therefore, first, the light reflected from the reflector is refracted downward through the tilted rear surface. This is effective to reduce the amount of light to be shaded at the shutter and, in particular, to reinforce the amount of light in the low-beam light distribution that has been pointed out to have lack of the amount of light. Accordingly, the present invention is excellently effective to improve the performance of the projector headlamp of this type.

Second, the polygonal concave rear surface of the projection lens is possible to impart novel appearances through a variety of designs to the projector headlamp even though only the projection lens is observed when the projector headlamp is mounted on the vehicle body. Accordingly, the present invention is also excellently effective to improve the fine view of the projector headlamp of this type.

UNITED STATES PATENT AND TRADEMARK OFFICE

CERTIFICATE OF CORRECTION

PATENT NO. : 6,821,008 B2 
APPLICATION NO. : 10/267901
DATED : November 23, 2004
INVENTOR(S) : Yosuke Tokoro et al.

It is certified that error appears in the above-identified patent and that said Letters Patent is hereby corrected as shown below:

Please delete Column 1, line 1 through Column 5, line 4 and substitute with the new specification as follows: (cont'd)

Having described the embodiments consistent with the invention, other embodiments and variations consistent with the invention will be apparent to those skilled in the art. Therefore, the invention should not be viewed as limited to the disclosed embodiments but rather should be viewed as limited only by the spirit and scope of the appended claims. --

This certificate supersedes Certificate of Correction issued March 20, 2007.

Signed and Sealed this

Seventeenth Day of July, 2007

JON W. DUDAS
*Director of the United States Patent and Trademark Office*